United States Patent Office 3,008,796
Patented Nov. 14, 1961

3,008,796
METHOD OF PURIFYING GASES CONTAINING OXYGEN AND OXIDES OF NITROGEN
Holger C. Andersen, Morristown, and Carl D. Keith, Summit, N.J., assignors, by mesne assignments, to Engelhard Industries, Inc., Newark, N.J., a corporation of Delaware
No Drawing. Filed June 5, 1958, Ser. No. 739,991
13 Claims. (Cl. 23—2)

This invention relates to the selective removal of oxides of nitrogen from an oxygen-containing gas, and more particularly pertains to the selective removal of oxides of nitrogen from the waste gases produced by the oxidation of ammonia in the production of nitric acid.

In the production of nitric acid by the oxidation of ammonia, it is difficult to convert all of the oxides of nitrogen to nitric acid and, as a result of the incomplete conversion of these oxides, they are discharged with the waste or tail gases. The presence of such oxides in the waste gases is undesirable as they are of a corrosive nature and constitute a pollution problem.

The waste or tail gases of nitric acid processes generally have a composition on a dry basis of 0.1 to 0.5 percent by volume of mixed nitric oxide and nitrogen dioxide, about 3–4 percent by volume of oxygen, and the remainder is nitrogen. In addition, various amounts of steam may be included with the waste gas.

In copending application Serial Number 615,496, filed October 12, 1956, there is disclosed a single stage catalytic process for the purification of waste or tail gases wherein oxides of nitrogen are eliminated while heating values of the waste gases are simultaneously recovered. In this process, the oxygen present in the waste gases is removed by a catalytic combustion reaction, and the oxides of nitrogen are reduced to nitrogen and water. In catalytic processes of this type, it has been found that it is generally necessary to have a fuel present in a stoichiometric excess over the oxygen content of the waste gas, and under such conditions a very large quantity of heat is generated in the catalyst bed.

The high temperature attained by the catalyst is detrimental in that a loss of catalyst activity results, and the problem becomes of greater magnitude with increasing oxygen concentration in the waste or tail gases.

In copending application Serial Number 650,860, filed April 5, 1957, now Pat. No. 2,970,034, one method of overcoming the foregoing deficiencies is disclosed in which the removal of oxygen and the catalytic reduction of oxides of nitrogen in waste or tail gases is effected in two stages in such a manner that only a part of the total heat is generated in each stage. The temperature to which the catalyst is subjected is thus decreased and its life and activity are correspondingly extended.

In copending application Serial Number 694,502, filed November 5, 1957, now Patent No. 2,975,025, a process is disclosed by the use of which it is possible to effect the removal of oxides of nitrogen from waste or tail gases selectively, i.e. without appreciable consumption of the oxygen present in the gases, using ammonia as a fuel. The waste or tail gases and ammonia are passed over a supported platinum group metal-containing catalyst, i.e. the catalyst may be a platinum group metal-containing catalyst per se on a suitable support, or a platinum group metal in admixture with another of the platinum group metals.

In accordance with the present invention, it has been found that oxides of nitrogen may be selectively removed from waste or tail gases without appreciable consumption of the oxygen present in the gases, i.e. it has been found that the use of ammonia as a fuel in combination with a supported cobalt, nickel, or iron-containing catalyst, effects the selective removal of oxides of nitrogen from a nitrogen-containing gas.

The catalysts used in the process of the invention may be iron, cobalt or nickel per se, on a suitable support, or mixtures of two or more of these metals. Suitable catalyst supports are alumina, including activated alumina and the like, silica, silica gel, diatomaceous earth and other similar catalyst supports. For optimum conversion, the catalyst metal should be present in a concentration within the range of about 0.5 to 50 weight percent of the catalyst metal and support. The support for the catalyst metal may be in the form of pellets, granules or powder. The supported catalyst may be prepared in any suitable manner, e.g., by treating the carrier or support with a solution of a suitable metal compound, drying, and calcining in air, and treating in a reducing atmosphere. It is probable that the catalyst functions as an oxide or as a support-catalyst oxide complex. However, in some cases, the activity appears to be increased by treatment in a reducing atmosphere prior to use. The treatment with a reducing gas can beat the time of catalyst preparation or after the catalyst has been charged to the unit for use.

The composition of the gases which may be treated in accordance with this invention include those gases containing, by volume, from 0 to 22 percent oxygen, 0 to 2 percent nitric oxide, and 0 to 2 percent nitrogen dioxide, the balance being an inert gas such as nitrogen, argon, helium and the like. The preferred range of gas composition is, by volume, 0 to 7 percent oxygen, plus 0 to 1 percent nitric oxide, with the remainder being inert. The gas mixture may also contain water vapor in quantities up to about 8 percent by volume.

The fuel used is ammonia and it may be added to the gas mixture to be treated in an amount in the range of the stoichiometric quantity required for reaction with the nitric oxide to ten times or more the quantity required, and is preferably less than two times the quantity required.

The mixture of gas to be treated and ammonia fuel is passed over the catalyst at a space velocity in the range of about 3,000 to 100,000 standard volumes of gas per volume of catalyst per hour, preferably about 3,000 to 30,000 standard volumes per volume per hour.

The reaction temperature may be in the range of about 250 to 800° F., preferably about 300 to 600° F., the optimum temperature varying in accordance with the specific combination of catalytic metal and support utilized. The reaction pressure may be in the range of atmospheric to about 150 p.s.i.g., or higher.

The invention will be further illustrated by reference to the following specific examples:

*Example I*

Alumina pellets, for use as a catalyst support, were prepared by dissolving pure aluminum in hydrochloric acid, precipitating with ammonia, washing the precipitate to a low chloride content, aging the precipitate as a gel to about 80 percent trihydrate content, drum-drying the aged gel, extruding the aged gel through a $\frac{1}{16}''$ die plate, and calcining the pellets for two hours at a temperature of 480° C.

A catalyst consisting of 10 percent by weight of cobalt, supported on $\frac{1}{16}''$ diameter activated pellets, prepared as above described, was prepared as follows: 90 grams of the calcined $\frac{1}{16}''$ alumina pellets were placed in a three-necked flask equipped for vacuum impregnation. The flask was then evacuated and 49.3 grams of cobalt nitrate [$Co(NO_3)_2 \cdot 6H_2O$] diluted with distilled water to 67.5 ml. of solution were then added from a burette to the contents of the flask while the latter was vigorously agitated. The catalyst was then dried at 110° C., heated one hour at 420° C. in air and treated with flowing hydrogen at a temperature of 400° C. for two hours. The catalyst was cooled overnight in 7 percent hydrogen–93 percent nitrogen annealing gas.

The gas stream containing, by volume, 3.0 percent oxygen, 0.3 percent nitric oxide 0.36 to 0.40 percent ammonia, balance nitrogen, was passed through a 100 milliliter bed of the catalyst, at a flow rate of 70.6 standard cubic feet per hour, equivalent to a space velocity of 20,000 standard volumes of gas per volume of catalyst per hour. The reaction pressure was 100 p.s.i.g. The inlet temperature was varied in order to study the effect upon nitric oxide removal. At a temperature of 315° F., analysis of the downstream gas showed a 92 percent removal of nitric oxide; at 417° F., the removal was 98.7 percent complete.

*Example II*

The catalyst employed in this example consisted of 1 percent by weight of cobalt, supported on $\frac{1}{16}''$ activated alumina pellets, the catalyst being prepared in a manner similar to that disclosed in Example I above.

A gas having the same composition as that treated in Example I above, was treated using flow rates and pressure identical with those employed in Example I above. Nitric oxide removal varied as follows, with the varying inlet temperatures indicated: 300° F., 77 percent; 421° F., 94 percent; 518° F., 98.7 percent; 612° F., 89 percent; and 720° F., 83 percent.

*Example III*

A catalyst consisting of about 5.5 percent by weight of nickel, supported on commercial activated $\frac{1}{8}''$-diameter alumina-approximately 6 percent silica spheres, was employed for the treatment of a gas having the same composition as that used in Example I above, the gas being treated under the same conditions of flow rate and pressure used in Example I. The inlet temperature was varied and the residual nitric oxide was determined by analysis, with the following results:

| Inlet Temp., ° F. | Nitric Oxide Out, Percent | Removal, Percent |
| --- | --- | --- |
| 324 | 0.0387 | 87 |
| 420 | 0.0350 | 88 |
| 532 | 0.0639 | 79 |
| 617 | 0.090 | 70 |

The catalyst used in this example was prepared by slowly tumbling 288 grams of the alumina-silica spheres, and adding 66.6 grams of nickel nitrate

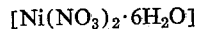
[Ni(NO₃)₂·6H₂O]

diluted with water to 97 ml. of solution. Tumbling was continued while the pellets were partially dried under an infrared lamp, the impregnated spheres were then dried at 100° C., calcined at 430° C. in flowing air and treated in a hydrogen stream at a temperature in the range of 500 to 600° C.

*Example IV*

In this example, the catalyst used contained 5 percent by weight of iron, deposited on $\frac{3}{16}''$ diameter pellets of commercial diatomaceous earth. In the preparation of the catalyst, 54.2 grams of ferric nitrate

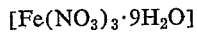
[Fe(NO₃)₃·9H₂O]

were added to 142.5 grams of $\frac{3}{16}''$ pelleted kieselguhr, using a method similar to that employed in Example III above. The impregnated pellets, without drying, were heated to 400° C. in flowing hydrogen, treated two hours at 400° C. while maintaining hydrogen flow, and cooled to room temperature in flowing 7 percent hydrogen–93 percent nitrogen annealing gas.

A gas which was passed through this catalyst had the same composition as that used in Example I above, and the reaction conditions were the same as those used in Example I above, with the exception of the inlet temperatures to the catalyst bed. Nitric oxide removals of the following magnitude were observed for the gas inlet temperatures indicated:

Inlet temp., ° F.:                        Removal, percent
332 ———————————————————————————— 68
432 ———————————————————————————— 46
537 ———————————————————————————— 58
612 ———————————————————————————— 60
710 ———————————————————————————— 70

While these removals are less complete than those using the cobalt and nickel catalysts, catalytic action is provided by the fact that the use of the same gas flow rates in the empty reactor resulted in nitric oxide removals of only 31 to 44 percent, in the temperature range of 317 to 516° F.

*Example V*

A catalyst consisting of 5 percent by weight cobalt, supported on commercial activated $\frac{1}{8}''$-diameter alumina-approximately 6 percent silica spheres, was prepared by adding 74.1 grams of cobalt nitrate [Co(NO₃)₂·6H₂O] to 296.5 grams of alumina spheres, using a method similar to that employed in Example III above, except that the catalyst was treated in flowing hydrogen for two hours at 420° C.

A gas having the same composition as that used in Example I above, was treated under the same reaction conditions, with the exception that the inlet temperatures to the catalyst bed were varied. Nitric oxide removals were observed as follows:

| Inlet Temp., ° F. | Nitric Oxide Out, Percent | Removal, Percent |
| --- | --- | --- |
| 228 | 0.0315 | 89.7 |
| 322 | 0.0358 | 88.1 |
| 413 | 0.0145 | 95.3 |
| 518 | 0.0113 | 96.2 |
| 614 | 0.0298 | 90.1 |

It will be obvious to those skilled in the art that many modifications may be made within the scope of the present invention without departing from the spirit thereof, and the invention includes all such modifications.

What is claimed is:

1. A process for effecting selective reduction reactions of gases containing a trace to 22 percent oxygen, trace to 2 percent of nitric oxide, trace to 2 percent of nitrogen dioxide, and the remainder an inert gas, which comprises contacting in a reaction zone an admixture of the gases and ammonia at reaction temperature with a catalyst selected from the group consisting of cobalt, nickel and iron, whereby selective reduction of the oxides of nitrogen is effected.

2. A process according to claim 1 in which the catalyst is cobalt.

3. A process according to claim 1 in which the catalyst is nickel.

4. A process according to claim 1 in which the catalyst is iron.

5. A process for effecting selective combustion reactions of gases containing a trace to 22 percent oxygen, trace to 2 percent of nitric oxide, trace to 2 percent of nitrogen dioxide, and the remainder an inert gas, which comprises contacting in a reaction zone an admixture of the gases and ammonia at reaction temperature with a catalyst selected from the group consisting of cobalt, nickel, and iron, the ammonia being present in at least the stoichiometric quantity required for complete reaction with the oxides of nitrogen, whereby selective reduction of the oxides of nitrogen is effected.

6. A process according to claim 5 in which the catalyst is cobalt.

7. A process according to claim 5 in which the catalyst is nickel.

8. A process according to claim 5 in which the catalyst is iron.

9. A process for effecting selective combustion reactions of gases containing a trace to 22 percent oxygen, trace to 2 percent of nitric oxide, trace to 2 percent of nitrogen dioxide, and the remainder an inert gas, which comprises contacting in a reaction zone an admixture of the gases and ammonia with a catalyst selected from the group consisting of cobalt, nickel, and iron, at a temperature in the range of about 250 to 800° F., the ammonia being present in at least the stoichiometric quantity required for complete reaction with the oxides of nitrogen, whereby selective reduction of the oxides of nitrogen is effected.

10. A process for effecting selective combustion reactions of gases containing a trace to 22 percent oxygen, trace to 2 percent of nitric oxide, trace to 2 percent of nitrogen dioxide, and the remainder an inert gas, which comprises contacting in a reaction zone an admixture of the gases and ammonia with a catalyst selected from the group consisting of cobalt, nickel, and iron, at a temperature in the range of about 250 to 800° F., and a space velocity in the range of about 3,000 to 100,000 standard volumes of gas per volume of catalyst per hour, the ammonia being present in at least the stoichiometric quantity required for complete reaction with the oxides of nitrogen, whereby selective reduction of the oxides of nitrogen is effected.

11. A process according to claim 10 in which the catalyst is cobalt.

12. A process according to claim 10 in which the catalyst is nickel.

13. A process according to claim 10 in which the catalyst is iron.

References Cited in the file of this patent
UNITED STATES PATENTS 2,381,696     Shapleigh _____ Aug. 7, 1945

OTHER REFERENCES

Rideal and Taylor: "Catalysis in Theory and Practice," The Macmillan Co., Ltd., London, 2nd Ed., 1926, pages 246–247.